United States Patent [19]

Renken et al.

[11] Patent Number: 4,685,331
[45] Date of Patent: Aug. 11, 1987

[54] THERMAL MASS FLOWMETER AND CONTROLLER

[75] Inventors: Wayne G. Renken, San Jose; Dan B. LeMay, Palos Verdes Estates; Ricardo M. Takahashi, Ben Lomand, all of Calif.

[73] Assignee: Innovus, San Jose, Calif.

[21] Appl. No.: 721,535

[22] Filed: Apr. 10, 1985

[51] Int. Cl.[4] .............................................. G01F 1/68
[52] U.S. Cl. ........................................ 73/204; 137/486
[58] Field of Search ........................... 73/204; 137/486

[56] References Cited

U.S. PATENT DOCUMENTS

| | | | |
|---|---|---|---|
| 2,947,938 | 8/1960 | Bennett | 73/204 |
| 3,683,692 | 8/1972 | Lafitte | 73/204 |
| 3,803,912 | 4/1974 | Ohno | 73/195 |
| 3,942,378 | 3/1976 | Olmstead | 73/204 |
| 3,971,247 | 7/1976 | Rodder | 73/204 |
| 3,992,940 | 11/1976 | Platzer, Jr. | 73/204 |
| 4,345,465 | 8/1982 | Gruner et al. | 73/204 |
| 4,471,647 | 9/1984 | Jerman et al. | 73/23.1 |
| 4,542,650 | 9/1985 | Renken et al. | 73/204 |
| 4,548,078 | 10/1985 | Bohrer et al. | 73/204 |

Primary Examiner—Herbert Goldstein
Attorney, Agent, or Firm—Thomas S. MacDonald; Alan H. MacPherson; Paul J. Winters

[57] ABSTRACT

A mass flowmeter and controller measures the mass flow rate of liquid or gaseous fluids and controls the flow rate of the fluids being utilized in a processing operation. A series of flow channels and blocked channels are micro-etched from a silicon substrate leaving an integral membrane suspended across the channels. A heater-sensor thin film resistor, diode or transistor is formed on the membranes and the substrate during manufacture to sense the temperature at particular locations. A cover housing matching channels and grooves forms flow and stagnant blocked conduits in the structure. Through a bridge circuit a signal indicative of mass flow is produced. This signal is passed to a control valve armature coil in an in-line flow control valve. The controller includes a sensor module containing monitored flow and blocked channels and passive by-pass channels as required for additional flow capacity, a control valve cartridge, an overall housing and the magnetic armature coil which controls the flow of fluid through the valve and the sensor module.

3 Claims, 13 Drawing Figures

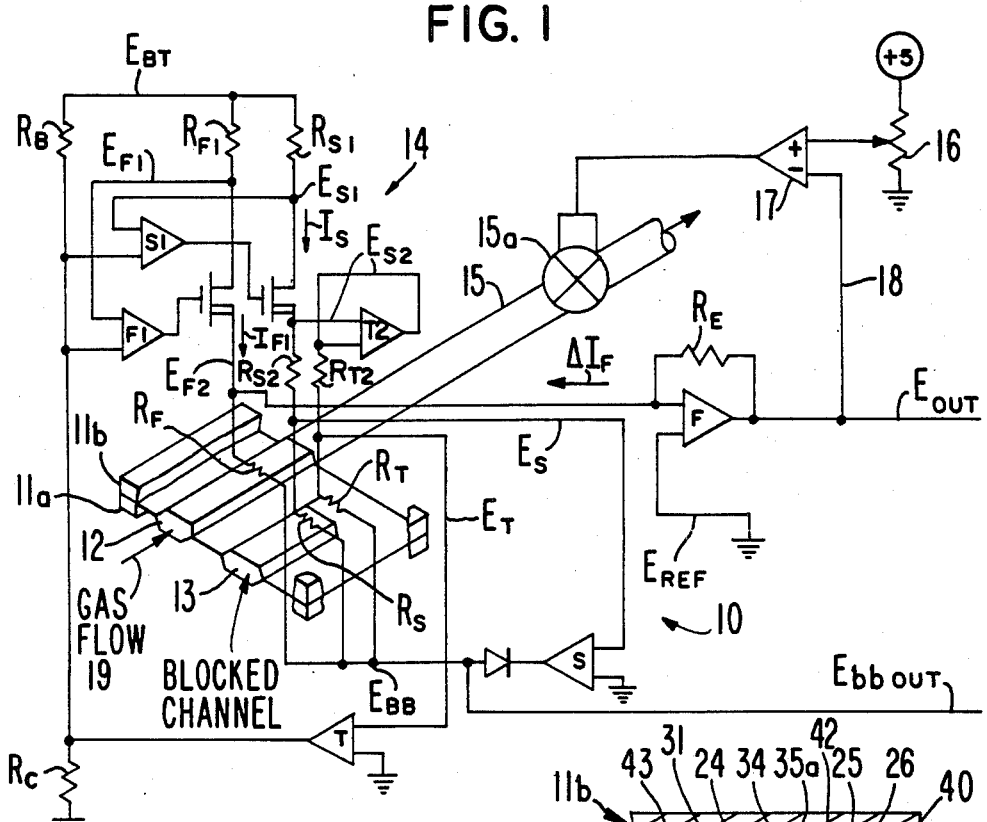
FIG. 1
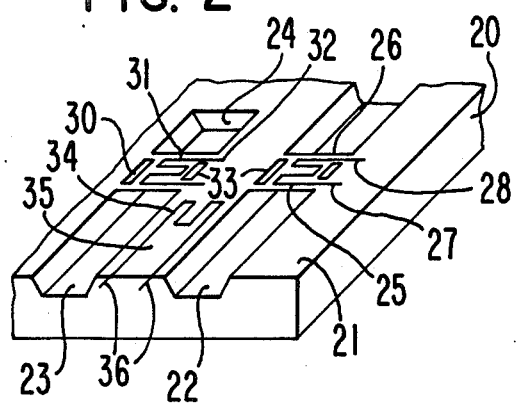
FIG. 2
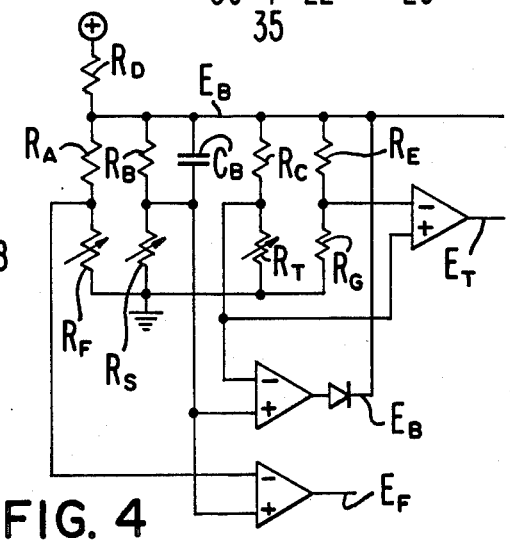
FIG. 3
FIG. 4

FIG. 10
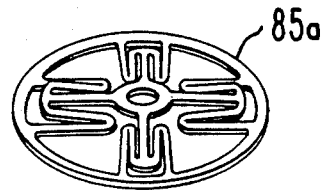
FIG. 11a
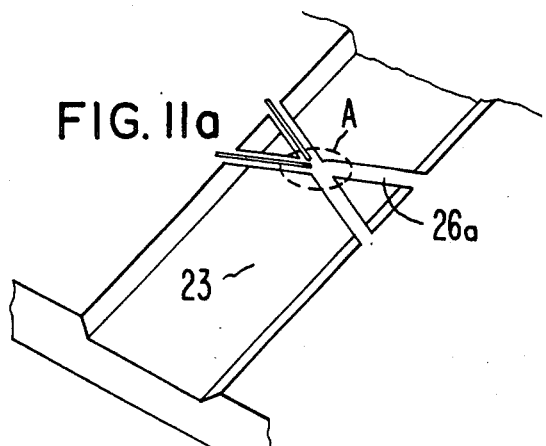
FIG. 11b
FIG. 12
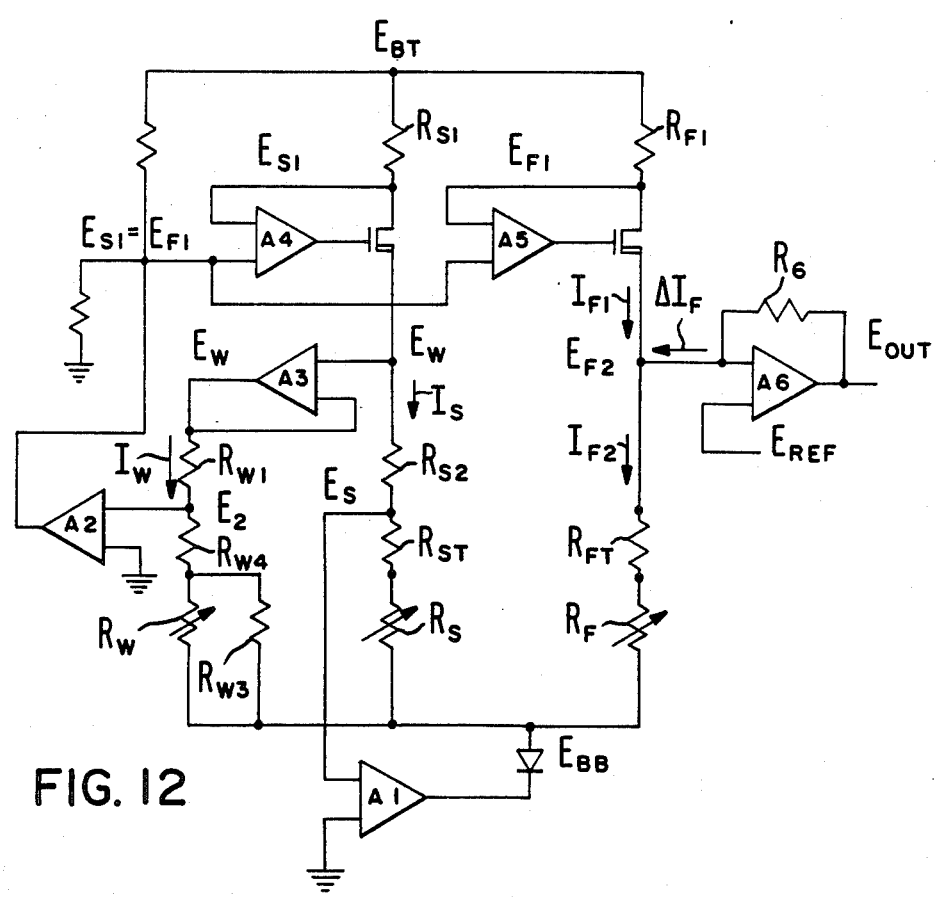

THERMAL MASS FLOWMETER AND CONTROLLER

CROSS-REFERENCE TO RELATED APPLICATION

This invention is an improvement to U.S. application Ser. No. 526,860, filed Aug. 26, 1983, now U.S. Pat. No. 4,542,650, by Renken/LeMay and having a common assignee. The subject matter of such application is incorporated herein by reference.

BACKGROUND OF THE INVENTION

1. Field of the Invention

This invention relates to a thermal mass flowmeter and controller which includes sensors for measuring the mass flow rate of liquid or gaseous fluids, electromagnetic control valves, associated amplifiers, and bridge and signal conditioning circuits. It further relates to the utilization of semiconductor type materials to make extremely small and accurate flowmeters for measuring and controlling the flow of semiconductor processing gases, medical anesthetic gases, and gases used for analytic instruments.

2. Prior Art

In addition to the prior art recited in the related application, namely single element hot wire anemometers and flow sensors utilizing two or three-element configurations of heaters and temperature sensors, U.S. Pat. No. 4,478,076 shows a flow sensor consisting of a pair of heat sensors disposed on opposite sides of a heater. The sensors and heaters are fabricated by depositing resistive material on a thin film of silicon nitride previously deposited on a silicon substrate. After patterning the resistor it may be encapsulated with a suitable thermal insulator such as silicon nitride. An air space etched out underneath the sensor elements allows air flow past the top and bottom of the sensors and heater.

U.S. Pat. No. 4,471,647 describes in context of a gas chromatographic assembly, a thermal detector in which the gas being thermally measured passes through apertures in a silicon dioxide membrane containing sensor and heater elements. The membrane-sensor structure is supported by a silicon substrate in which an aperture is etched to thermally isolate the membrane, provide perimeter support, and allow gases to pass through the substrate.

U.S. Pat. No. 3,931,736 shows an improvement over fluid flow sensors which are positioned on the exterior surface of a conduit. The improvement entails placing a thin imperforate membrane functioning as one wall of an active flow channel and a dead flow channel, the latter to obtain reference readings under conditions of substantially no fluid flow. Sensors are placed on the surface of the membrane away from the channels so that the sensors are not in direct contact with the fluid. The bottom surface of the membrane is in contact with the fluid and the sensor chips are thermally coupled to the membrane.

U.S. Pat. No. 4,343,768 describes a catalytic gas detector formed from a self-heated temperature sensor deposited on a thin dielectric film supported by a substrate. The substrate is etched under the sensor region to form a physical bridge which is thermally isolated. Catalytic films are deposited on the heater-sensor to promote chemical reactions. The sensor measures heat generated by the reaction.

The above designs can be used to measure the mass flow rate of fluids passing parallel to and near the substrate surfaces. They have limited inherent accuracy because the sensor elements may not be placed at a location within the flow conduit where the local fluid velocity is representative of the total flow, and the substrate placement in the flow conduit may introduce turbulence—further decreasing measurement accuracy.

SUMMARY

The present invention simplifies and improves the performance of mass flow meters. It enables highly accurate flow measurement utilizing an integral, controlled geometry flow conduit, and accurate placement of the sensor structures within the conduit. Flow velocities are limited, providing laminar flow within the conduit and above and below the sensor structures. High measurement accuracy—better than 99%—is achieved, with good signal levels—(10 to 40 millivolts). Very low measurement temperatures—typically 25° C. rise above ambient enables measurements of reactive fluids with low decomposition temperatures. Low-mass sensor structures enable very fast response times—typically below 2 milliseconds. A high thermal conductivity cover substrate providing the upper portion of the flow conduit, protects the sensor elements from external radiation—a source of measurement error. It also provides for improved heat transfer into the gas flowing within the flow conduit and establishes an accurate gas ambient temperature equal to the substrate temperature. The cover substrate maintains uniform heat transfer from the sensor elements, limits gas convection at zero flow velocity, provides an accurate and stable zero flow signal, and eliminates offsets in the zero-flow signal when the sensor's position is shifted with respect to gravity.

Self heated flow sensors are supported on silicon oxynitride webs within flow channels and also within separate blocked, zero-flow, stagnant gas channels. The reference signal derived from the stagnant gas blocked channel provides an accurate zero flow signal which improves the flowmeter accuracy. A wall temperature sensor is formed on the silicon sensor substrate adjacent to the wall of the flow channel(s) to provide a measurement of local temperature and an accurate indication of the inlet gas temperature to the flow sensor. The signal derived by comparing the stagnant gas sensor to the wall temperature sensor provides a measurement of gas properties affecting flow sensor sensitivity. The amplified difference signal is used to control a bridge excitation current. Feedback means is used to regulate the temperature rise of the stagnant gas sensor above ambient, thereby tending to provide more constant gain. For example, a gas such as helium has high thermal conductivity and needs more excitation power to maintain the sensor's temperature rise, and thus signal strength. The flow sensor versus the stagnant gas sensor provides a flow signal which is always null at zero flow by symmetry. Because of the variable bridge excitation current provided, the circuit has a gain which is at least partially compensates for gas dependent properties and their effect on sensitivity. Further correction of gain, linearity, and zero stability can be made by:

Temperature compensation based upon the wall sensor signal.

Gain and linearity compensation using bridge current schedule.

Gas species-specific tabular correction.

Various bridge circuits are connected to the wall temperature sensor and with a fixed resistor ratio reference to provide a temperature signal for compensation of a flow signal.

The mass flowmeter of the invention is preferably manufactured utilizing a channel layout with double planes of symmetry and in which redundant flow and stagnant flow sensor elements and conduits are provided to increase the yield of elements meeting desired specifications.

The above mass flowmeter is integrated into a mass flow controller. The controller uses the above flow sensor which is a micromachined silicon sensor substrate assembly installed with an integral laminar flow element to increase the flow capacity. The low-thermal-mass sensor elements respond to changes in mass flow in tenths of milliseconds while heating the gas to a maximum temperature of 25° C. above ambient in the preferred embodiment, avoiding reactions in the gas and particulate formation. The sensor assembly is close-coupled to a low mass, normally closed solenoid valve to achieve a response of less than 0.06 seconds to within 98% of flow set point with freedom from overshoot, flow surges, and oscillations. The stainless steel plug-in housing has no external welds or threads exposed to the gas stream. A low friction, spring-suspended valve armature is provided. High magnetic drive forces and a low mass armature enables stable, positive valve control with minimum sensitivity to vibration. The sensor elements are enclosed within the flow stream which provides high thermal isolation from the external environment, making the mass flow controller attitude independent and essentially free from calibration drift. The valve consumes low power (below 2 watts) and has less than 1° C. temperature rise in normal operation.

An alternative embodient of the invention utilizes a sensor on a web suspended within the flow channel near the inlet. It is used in place of the wall sensor to determine inlet gas temperature and to provide an ambient temperature reference for both the stagnant and flow sensors. Minimal power is utilized in the temperature measurement to reduce self heating and the resulting ambient temperature offset.

Another alternative embodiment of the invention utilizes diodes or transistors formed in thin silicon islands supported on a silicon oxynitride beam or bridge spanning the flow channel. Heat is produced by forward biasing the device junctions. Temperature is measured by sensing changes in the forward bias junction voltage drop which is a function of temperature and thus flow.

BRIEF DESCRIPTION OF THE DRAWINGS

FIG. 1 is a schematic circuit diagram of the overall mass flowmeter and flow rate control system.

FIG. 2 is a partial perspective view of one half of the mass flow meter channel construction with the cover removed.

FIG. 3 is a partial end view of the overall flow meter channel construction.

FIG. 4 is a schematic diagram of the sensors and amplifiers in a bridge circuit for providing a temperature compensated flow signal.

FIG. 10 is a perspective view of a non-planar open spring used in the FIG. 9 preferred form of the invention.

FIGS. 11a and 11b are partial perspective views showing the mounting of a diode or transistor on a substrate membrane in a further embodiment of the invention.

FIG. 12 is a schematic of an alternative bridge and control circuit.

DETAILED DESCRIPTION

Figure 5:
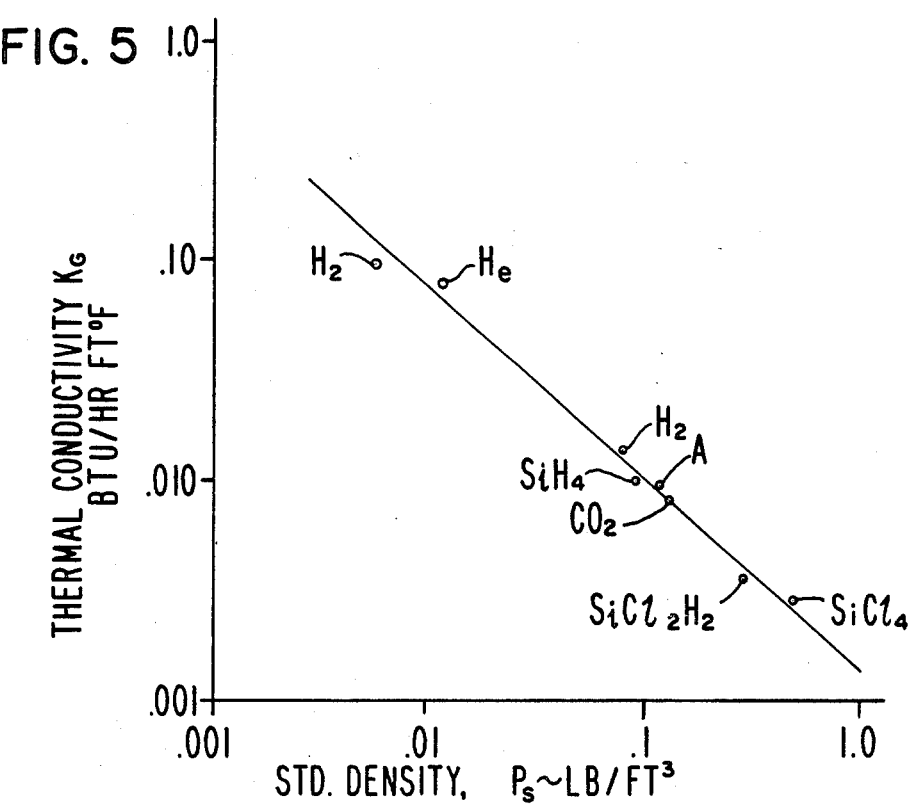
FIG. 5 is a graphical representation of thermal conductivity versus gas density for various gas species for which flow rate is to be measured and controlled.

FIG. 1 schematically shows an overall flowmeter and control system 10 comprising a single-crystal semiconductor sensor substrate 11a forming one side of a gas flow channel or conduit 12 and blocked channel 13, and containing a thin film flow sensor $R_F$ and thin film stagnant gas sensor $R_S$, respectively. A thin film substrate temperature sensor $R_T$ is formed on said substrate near the two channels and measures the chip ambient temperature which is an indication of the temperature of the inlet gas flow shown by arrow 19. A matching cover substrate 11b with etched grooves but without sensor elements is aligned and bonded to the sensor substrate to form stagnant and flow conduits 12, 13. A bridge circuit 14 includes inputs from the sensors and has an output signal 18 ($E_{out}$) which in conjunction with a flow set point potentiometer 16 and amplifier 17 controls flow of gas through chip passage 12 and outwardly from the chip through conduit 15 to a gas-using apparatus (not shown) by movement of valve 15a in conduit 15. $R_B$, $R_C$, $R_{F1}$, $R_{S1}$, $R_{S2}$, $R_{T2}$ and $R_E$ are fixed resistors. $R_F$, $R_S$ and $R_T$ are the resistance temperature detectors whose resistances are of the form $R = R_0 [1 + TCR(T - T_0)]$ where R = resistance at temp. T
$R_0$ = resistance at temp. $T_0$ and
TCR = temperature coefficient of resistivity = $\partial R / \partial T$.

The temperatures (and therefore resistances) of $R_F$ and $R_S$ are significantly influenced by the equilibrium between their self-heating ($I^2R$) and their heat transfer to the gas. Amplifier S holds $E_S = 0$ by controlling $E_{bb}$. Amplifier T holds $E_T = 0$ by controlling $I_S$ and $E_{S2}$. Amplifier T2 reproduces $E_{S2}$ with no drain from $I_S$. Amplifier S1 and F1 hold $E_{F1} = E_{S1}$ so that $I_S R_{S1} = I_{F1} R_{F1}$. Amplifier F provides the output flow signal $E_{out} = \Delta I_F R_E + E_{REF}$ and supplies $\Delta I_F$ to hold $E_{F2} = E_{REF}$. $R_{T2}/R_{S2}$ governs the magnitude of the regulated temperature rise of $R_S$ above $R_T$.

An alternative bridge circuit is shown in FIG. 4 where $R_A$, $R_B$, $R_C$, $R_D$, $R_E$, $R_G$ are fixed resistors; $C_B$ is for circuit dynamic stabilization; $R_F$ is flow sensor resistance; $R_S$ is stagnant gas sensor resistance; and $R_T$ is wall temperature sensor resistance. $R_F$, $R_S$, $R_T$ are resistance temperature detectors whose resistances are of the form $$R = R_0[1 + TCR(T - T_0)]$$

where
- R = resistance at temp. T
- $R_0$ = resistance at temp $T_0$
- TCR = $\partial R/\partial T$ = temp. coefficient of resistance
- $E_B$ = bridge voltage = a function of gas thermal conductivity
- $E_F$ = gas mass flow rate signal
- $E_T$ = gas temperature signal The amplified bridge voltage feedback in FIG. 4 regulates the temperature difference between stagnant gas sensor $R_S$ and wall temperature sensor $R_T$. This implies that $$\frac{Q_s}{UA_s} = T_s - T_A = \text{constant} \quad (1)$$

where
- $Q_S$ = heat input to $R_S$
- U = overall heat transfer coefficient per unit area
- $A_S$ = heat transfer surface area of $R_S$
- $T_S$ = temp. of $R_S$
- $T_A$ = ambient temp.

U includes structural and gas conductivity terms, so equation (1) may be rewritten $$Q_S = \text{constant} \times UA_S = C_1 K_G + C_2 \quad (2)$$

where $C_1$ = constant coefficient for gas conduction geometry
- $C_2$ = structural support conduction coefficient
- $K_G$ = gas conductivity property This heat transfer equation is not dependent upon sensor flow rate because the measurement is made in the blocked stagnant channel.

$Q_S$ is also defined by the electrical parameters $$Q_s = E_B^2 \left[ \frac{R_S}{(R_S + R_B)^2} \right] \quad (3)$$

where
- $E_B$ = bridge voltage
- $R_S$ = stagnant gas sensor resistance
- $R_B$ = fixed bridge completion resistor At a given ambient temperature the term in brackets in equation (3) is constant, so that combining (2) and (3) gives $$E_B = \sqrt{\frac{C_1 K_G + C_2}{C_3}} \quad (4)$$

$$\text{where } C_3 = \frac{R_S}{(R_S + R_B)^2}$$

which is a function of the fixed geometry and circuit parameters and has variability only with gas conductivity ($K_G$) and ambient temperature (included in $C_3$). An $E_B$ output signal is provided in both circuits FIG. 1 and FIG. 4 to allow remote monitoring of the bridge voltage.

FIGS. 2 and 3 illustrate one embodiment of the sensor chip. Thin film resistors 25, 31 and 34 are deposited on a dielectric film formed on the top surface 21 of a semiconductor substrate 20 of silicon or the like. A flow channel groove 22 is formed by etching of the surface 21 (after suitable masking and other steps as is known in the semiconductor processing art and as described below) completely along a longitudinal extent of the substrate. Apertures 33 are etched in the dielectric insulating membrane 26 to aid in the etching away of the underside of the web and to complete the fabrication of channel groove 22. The apertures also function to thermally isolate the web from the chip body. Web 26 supports thin film resistor 25. Simultaneously a stagnant gas channel groove 23 is etched in the substrate surface extending only part-way into the substrate so that the channel groove is blocked by wall 24. A membrane 30 supports thin film resistor 31 and contains apertures 33 which allow etchant access to the underside of the web. A thin film temperature sensor 34 is formed in the same plane as sensors 25 and 31 on a portion 35 of surface 21, either between or next to one of the channel grooves 22 or 23 or at the gas inlet. Suitable leads in the form of metallization pathways 27, 28, 32 and 36 connect the sensor to bonding-contact pads and in turn to the bridge circuit.

SENSOR FABRICATION METHOD

The sensor is formed by the following process sequence:

1. A high resistivity (>1 Ωcm) silicon wafer with a top surface crystallographic orientation on the <100> plane is doped with boron in a diffusion furnace to a surface dopant concentration $>2 \times 10^{19}$ atoms/cm$^3$.

2. An epitaxial silicon layer is deposited with a doping concentration $<5 \times 10^{17}$ boron and a thickness equal to the flow channel depth under the sensor bridge. This depth is 70 microns in the preferred embodiment.

3. A chemically vapor deposited film of silicon oxynitride is deposited onto the epitaxial layer. This silicon oxynitride layer will form the bottom half of the sensor bridge structure and is typically 1 micron thick.

4. Platinum approximately 1000 Å thick is sputtered onto the first silicon oxynitride layer.

5. An etch mask is formed on the platinum using conventional exposure masks, photoresist, and a contact aligner.

6. The platinum is etched to form the sensor resistors and interconnects.

7. A second 1 micron thick layer of silicon oxynitride is deposited over the platinum.

8. A second etch mask is formed to etch through the second silicon oxynitride layer to expose the sensor bonding (contact) pads.

9. Gold is sputtered over the surface and into the bonding pad openings to provide a 1 micron thick bondable metal on top of the platinum.

10. A third mask and suitable etch is used to remove the gold from all surfaces except the bonding pads.

11. A fourth mask is aligned referencing to the platinum resistor structures for etching the second and first layers of silicon oxynitride through to the epitaxial silicon surface. During this etch step, the sensor bridges are formed and openings to allow etching of the flow channel are delineated. The patterned silicon oxynitride serves as an etch mask for the next etch step.

12. The silicon flow channel is formed and the bridge structure is undercut and suspended by etching the silicon with an ethylene diamine pyrocatechol etch solution. This etchant is crystallographic orientation selective and has a much lower etch rate perpendicular to the <111> planes in silicon and does not etch silicon oxynitride. During the previous masking steps, care was taken to align the sensor structures so that the flow channel side wall is parallel to the wafer <111> plane, thus the silicon oxynitride mask is not undercut by the etchant at the side walls. The sensor bridge is easily undercut because of the shape and position of the apertures in the bridge structure. The silicon channel is etched down to the bottom of the epitaxial layer and stops when reaching the heavily doped boron layer. A flow channel with tight geometry control is achieved with the top width determined by the silicon oxynitride mask opening. The depth is controlled by the epitaxial layer thickness, and the side wall angles are determined by the intersecting angle between the crystalline <111> and <100> planes, which is 54° in silicon.

13. After flow channel and bridge formation, all surfaces are passivated with a chemically vapor deposited silicon nitride conformal coating 0.2 microns thick, to improve resistance to corrosive gases.

14. A fifth mask and etch is used to open the bonding pads in the silicon nitride film.

15. In the preferred embodiment a silicon crystal cover substrate is formed by the same process, but without resistors and bridges. This is achieved by eliminating the deposition and etching steps for the platinum, second silicon oxynitride, and gold films, and by using appropriately modified masks.

16. The sensor and cover substrates are bonded together by patterning a film of thermoplastic Teflon fluoropolymer or polyimide material which was formed on the cover substrate. Bonding material is restricted to the flat surface between flow channels. The bonding material is selected for resistance to corrosive gases and also for high temperature tolerence to allow further processing such as thermosonic lead bonding.

17. Substrate to substrate bonding is achieved by registering and clamping the wafers together and heat fusing the bond material.

18. The large number of sensor assemblies contained on the resultant wafer sandwich are separated by sawing (dicing) the wafer.

FIG. 3 illustrates the preferred embodient of the chip sensor and cover assembly 11a and 11b where a second semiconductor substrate 40 having flow channel groove(s) 42 and stagnant channel groove(s) 43 aligned with grooves 22 and 23, respectively, are bonded as at 44 to the first substrate 20. The matching grooves thus form a flow conduit(s) and stagnant conduit(s). The web or membrane 26 is shown bridging across the median between the grooves 22, 42 so that essentially laminar gas flow passes laterally over the top of the sensor membrane 26 and laterally under the bottom of that sensor membrane in the flow conduit. Sensor 31 also bridges over a medial plane of the substrates but is essentially in a no-gas flow position due to the blocked channel 23, 43. Body temperature sensor 34 is shown thermally bonded between facing surfaces 35, 35a of the two substrates.

FIG. 5 graphically illustrates various candidate gas species which show a correlation between thermal conductivity ($K_G$) and standard density ($\rho_s$). From the generally linear graph line in FIG. 5, it is seen that $K_G \approx f(\rho_s)$. Since equation (4) above shows that $E_B = f(K_G)$ therefore $$E_B \approx f(\rho_s) \tag{5}$$

Equation (5) is an approximation because FIG. 5 shows an approximate correlation and equation (4) shows that $E_B$ includes some ambient temperature effects. $E_B$ is useful for gas species estimation and for valve gain compensation.

Gas species estimation is useful for distinguishing between gases with moderate to significant differences in thermal condutivity when the gases are unknown, or estimating the composition of gas mixtures when the gases are known.

Valve control circuit gain need not be precise and should be a function of gas density. Equation (5) indicates that $E_B$ can provide that function. Since the primary function of the $E_B$ variation is flow sensor compensation, the secondary use of $E_B$ for gas species estimation and for valve gain control will be dependent upon the $E_B$ function optimized for the flow signal; i.e., after the circuit relationships in FIG. 1 have been optimized for the flow sensor, then the valve control circuit can be finalized for optimum use of that $E_B$ schedule for valve gain control. The $E_B$ signal is output to allow external monitoring of the signal which approximates gas thermal conductivity.

Figure 6:
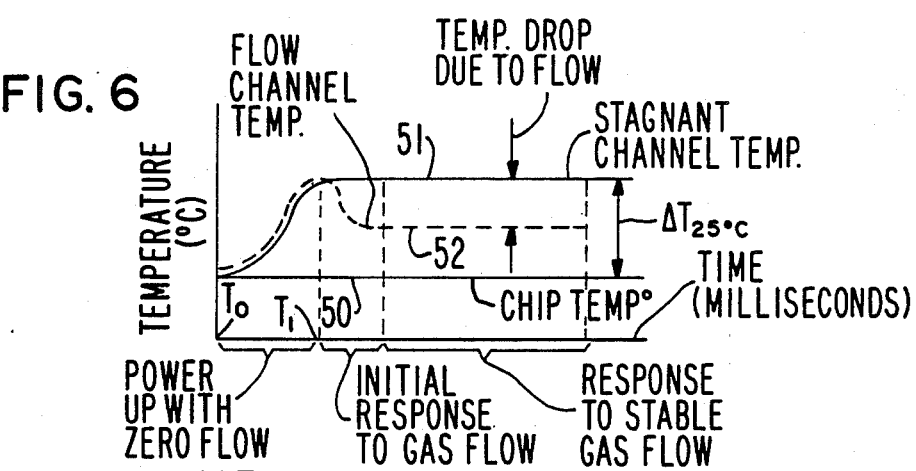
FIG. 6 is a graphical representation of temperature-time curves for the stagnant sensor, fixed temperature sensor and flow sensor illustrating response to energization of the circuit and response to flow.

FIG. 6 graphically illustrates the temperature-time relationships of the three sensors during flowmeter operation. Curve 50 represents the chip temperature sensed by resistor $R_T$ (FIG. 1) which slightly increases over time to a relatively constant value due to heat transfer to the chip walls from the flowing gas, heating input into the resistors $R_F$, and $R_S$, $R_T$, and self-heating. Curve 51 represents the temperature of the stagnant channel sensor $R_S$ which rises to a steady level above the chip temperature $T_T$. Heating current energizing sensor $R_S$ is controlled so that a $\Delta T$ of approximately 25° C. is maintained at steady state between $R_T$ and $R_S$. Curve 52 represents the temperature of flow sensor $R_F$ which is heated and utilized for flow (temperature) sensing. Its heat transfer, and therefore its temperature when heated, is largely dependent upon the forced-convection heat transfer from the sensor to the inlet gas which is a function of the mass flow rate of the gas and the properties of the gas. Typically, at time=$T_0$ curve 52 rises with curve 51 when the circuit is energized with no flow. When flow is initiated (shown at time=$T_1$) heat is transferred from the sensor $R_F$ to the flowing gas and the temperature dips to a flow-dependent value below the temperature represented by sensor $R_S$ in the no-flow stagnant channel. The temperature drop in FIG. 6 is nonlinearly proportional to gas flow.

Figure 7:
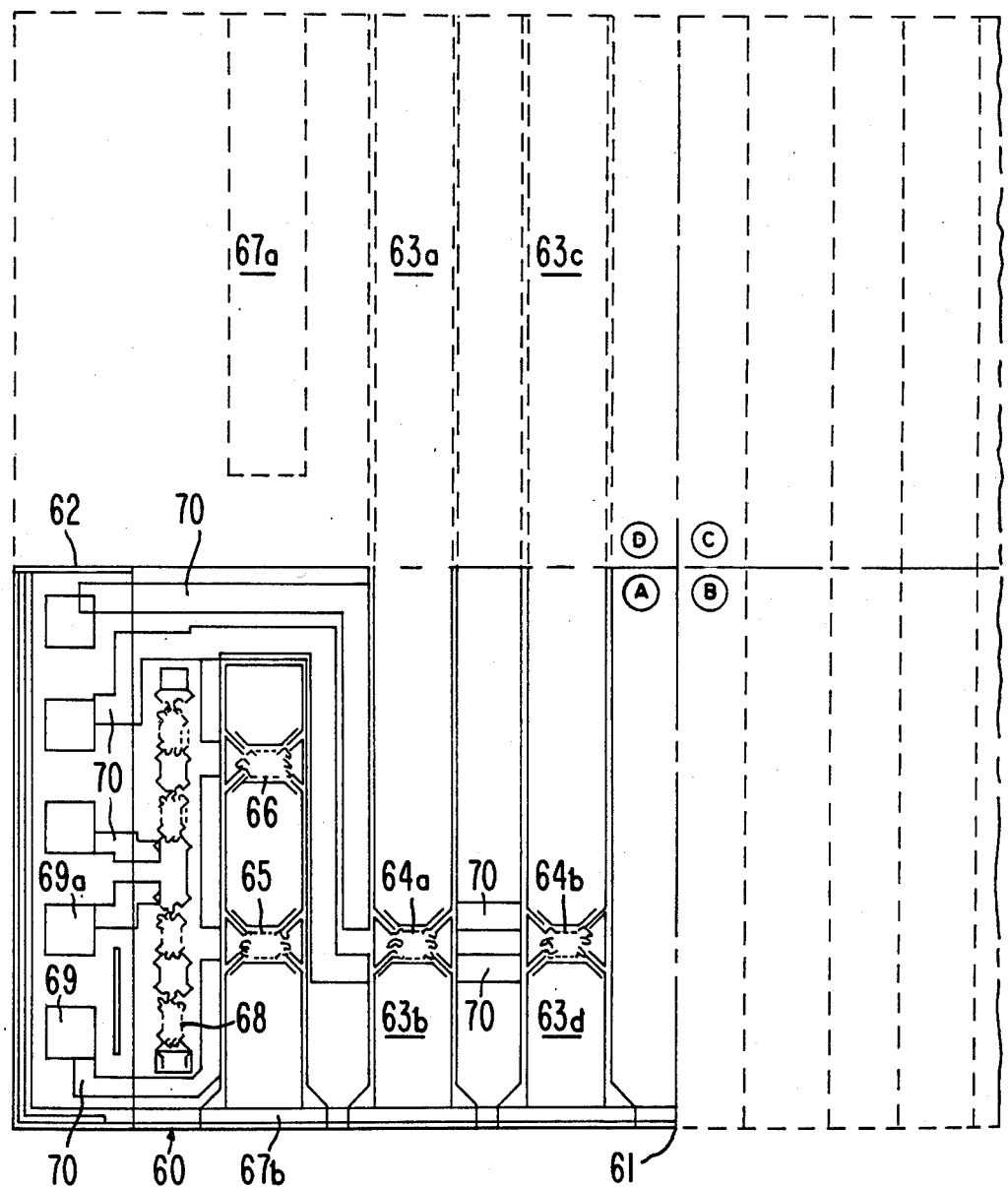
FIG. 7 is a plan view of a channel and sensor layout showing one quadrant in detail of an overall layout which is rotatable about double planes of symmetry.

FIG. 7 illustrates a preferred embodiment of the sensor substrate construction where a silicon chip 60 is fabricated having repetitive patterns thereon in two planes of symmetry. Thus one quadrant (A) of the overall substrate is detailed in FIG. 7 with the pattern being "flipped" and repeated to the right of axis 61 and the resultant double pattern "flipped" and repeated above axis 62. This forms four sensor groups divided into four quadrants A, B, C, and D. The flow channel or groove 63b is a continuation of flow channel 63a formed in quadrant D. Flow channel 63d is similarly a continuation of 63c. Entry of inlet gas is at the top edge of channels 63a and 63c. The gas thus travels the length of channel 63a toward channel 63b and becomes laminar in flow. It passes the sensor in channel 63a (not shown) which is inoperative unless it is found that sensor 64 in channel 63 does not meet specification in which case the flow path would be reversed and the channel 63a sensor would be utilized in the bridge circuit. This increases yield from the chips which are fabricated. This unused inlet sensor can be utilized in an alternate embodiment of the invention to measure inlet gas temperature in place of the wall sensor. Likewise, a second blocked channel 67a is opposite blocked channel 67b. Blocked channel 67b has two sensors 65, 66 connected in series for a close resistance match with series flow sensors 64a and 64b. A series of resistors 68 extend on a flat substrate surface in the same plane as resistors 64, 65 and 66 adjacent the edge of blocked channel 67b, but thermally coupled to the silicon chip to measure substrate temperature $R_T$. The pattern of the resistors 64a, 64b, 65, and 66 are identical to avoid resistance differences resulting from geometrical variations. Suitable contact and bonding pads 69, 69a are provided on the outer edges of the chip for connection to the various sensors and by interconnecting metallization pathways 70 to the bridge circuit.

The set of sensors and channels in quadrant B to the right of axis 61 may be utilized to derive multiple signals to be compared for more accurate flow information or diagnosis of calibration shifts due to particulate obstructions. The flow indication in either is utilized if both indicate similar flow. A flow sensor indicating dissimilar and lower flow is disregarded indicating a closed, partially closed, or inoperative flow channel. This is fully explained in the related application, pages 9–10 and FIG. 2. As to the related application, averaging several channel readings, e.g., four, and throwing out a reading which is at a prescribed level indicative of a blockage in flow in that channel, and then reaveraging the "good" remaining three channels is a function easily performed by a microprocessor and well within the ordinary skill in the concerned art. Those multiple signals from various channels are shown in the related application as inputs 25a, 25b and 25c (as well as the input from amplifier 23 from the illustrated channel) which are fed to the converter. Page 10, lines 9–29 describe the function of the control circuit. Thus, the readings from each channel are monitored to determine if any are "plugged" and if so, that particular channel(s) group of sensors are "disregarded" (page 10, line 25).

A to D converter 24 (FIG. 2 of the related application) receives flow signals from independent sensors from amplifier 23 and 25a, 25b and 25c. Calibrator 28 contains within its PROM memory (page 11, lines 6–10) the output signal ratios of flow through each of channels 21 (FIG. 3 of the related application) measured in the uncontaminated state during manufacture and test. These ratios of one sensor output compared to another are intrinsic and are maintained over normal flow ranges if all channels remain free of contamination. Controller 26 digitally averages flow sensor signals of all the channels resulting in a composite flow signal.

The controller 26 in the related application continuously compares the flow ratios among the flow sensor channels If the ratios are not generally maintained to their original calibrated values (stored in PROM) the controller identifies the abnormal low-output from a channel output and excludes the channel(s) output from being averaged. This results in a composite flow signal excluding a low-output sensor. The controller then compares the composite flow signal to the requested set-point input and increases or decreases the valve drive signal to regulate flow through the downstream valve.

Figure 8:
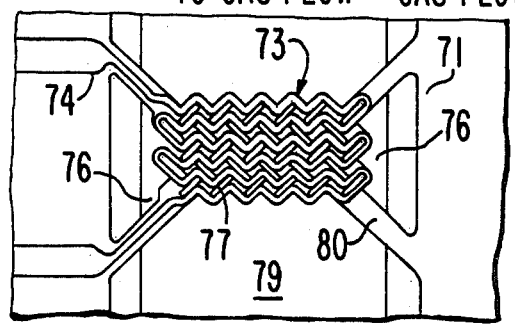
FIG. 8 is a highly magnified (100×) plan view of a resistance sensor/heater on a membrane bridging over a channel.

FIG. 8 shows a highly magnified view of the sensor 80, membrane, used in a stagnant (blocked) or flow channel. Resistor sinuous patterns 73 with conductive pathways 74 leading to interconnecting pads are first formed on the silicon oxinitride film previously deposited on substrate 71. Certain portions of the silicon oxinitride film are then masked and etched to form large end apertures 76 and small slit-like apertures 77 to allow flow of etchant under the to-be-formed membrane 80. As the substrate is etched out under apertures 76 and 77 and in areas upstream and downstream of the sensor to form groove 79 they leave a membrane 80 integrally bridging or suspended across the groove. Apertures 76 also function to thermally isolate the sensor from substrate 71. In use there is no purposeful flow of the gas under control through the apertures 76, 77. The gas flows parallel to the top and bottom surfaces of the membrane in essentially laminar flow as it traverses the facing grooves of the sensor and cover substrates making up the overall flow conduit e.g. 22, 42 in FIG. 3. The entire flow conduit is preferably passivated with silicon nitride.

Figure 9:
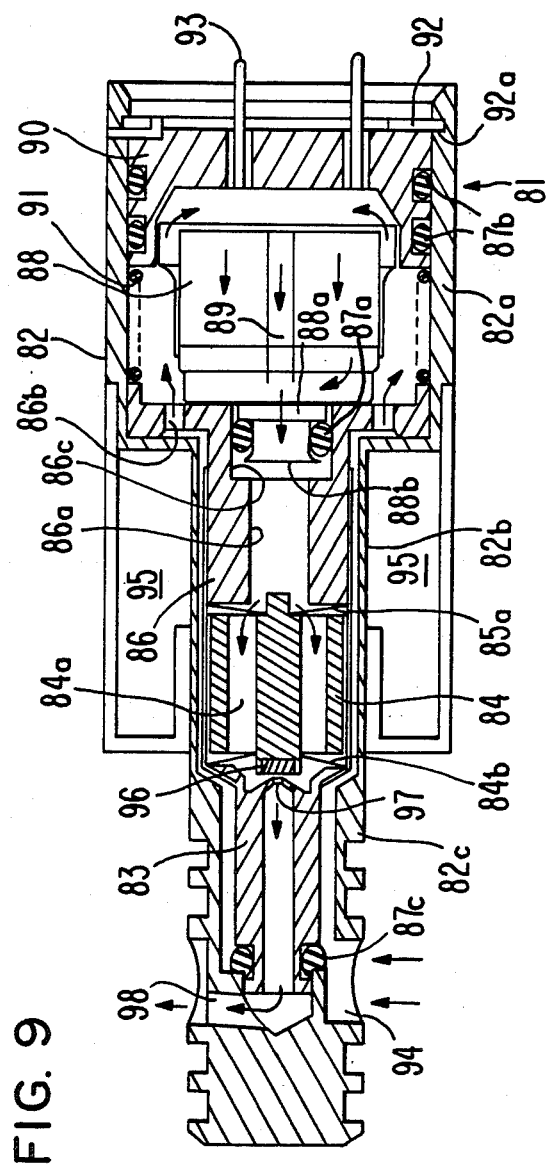
FIG. 9 is a cross-sectional side view of the preferred form of the invention showing inlets to the flow sensor channel(s), flow by-pass and an in-line outlet gas flow valve operable in response to flow measured by the sensor.

FIG. 9 shows the preferred form of the invention utilizing an integral control valve arrangement. The overall flow controller 81 comprises an outer housing 82 having an upper (the right side in FIG. 9) flow-sensor housing portion 82a, a mid-portion 82b housing a valve-actuating armature and a lower portion 82c housing working gas inlet 94 and outlet 98. A valve seat 83 is inserted from the top of housing 82 and held within the interior of portion 82c adjacent outlet 98 and sealed by O-ring 87c. Valve seat 83 contains a valve orifice 97 at its top. An armature 84, which contains cylindrical flow passages 84a, is positioned above valve seat 83 with an open sinuous lever spring 84b therebetween, the outer periphery of the spring being seated on the valve seat top and the inner periphery against the armature bottom. A second open sinuous lever spring 85a has an inner periphery seating on the top of the armature. An annular pole piece 86 is inserted on top of spring 85a with its bottom contacting the outer periphery of spring 85a. Pole piece 86 has a lower central flow passage 86a, an upper flange with cylindrical flow passages 86b and a central upper bore 86c.

An annular flow sensing and by-pass module 88 has an active flow measuring section 89 (corresponding to members 11a, 11b FIG. 1) extending centrally or diametrically therethrough, and has an extension 88a including an outlet 88b which is held in bore 86c by O-ring 87a. Lastly, a closure plug 90 having O-rings 87b in its periphery is pressed into the housing top interior against spring 91 and a lock ring 92 inserted in interior ring groove 92a to hold the overall assembly.

Connector pins 93 extend through insulated feedthroughs in plug 90 and are connected by a flex cable to contact pads (FIG. 7) extending from the sensors in the flow measuring section 89. Valve seat 83, armature 84, pole piece 85 and flow section module 88 are centrally located in the cylindrical housing 82 and each have outer side walls concentrically spaced from the interior side walls of the respective housing portions 82c, 82b and 82a so that an outer generally annular flow passage is formed to convey inlet gas to be measured in flow from inlet 94 up the outer annular flow passage and down through the sensing and by-pass module 89, 88, all as indicated by the shown flow arrows.

An armature coil 95 surrounds armature 84. Flow of current through the coil is in an amount dictated by a desired set point and by variations in flow sensed by the flow channel sensor and the bridge circuit (FIG. 1). Actuation of the coil moves the armature 84 so that a valve seal 96 on the axis and bottom of the armature is positioned above valve seat orifice 97 to regulate gas flow through the orifice. Non-flat compression springs 85a, 85b center the armature and act to press the armature valve seal against orifice 97 so that upon cessation of current flow in the armature coil the valve returns to a fail-safe closed position.

When the high iron permeability armature is in its uppermost position, the valve seal on the armature is displaced a maximum distance from the valve orifice, providing maximum flow capability. As current in the armature coil decreases the magnetic force holding the armature against the spring 85a decreases so that the spring pushes the armature and its valve seal closer to the valve orifice, thus downwardly adjusting the amount of gas flow through the orifice. A dead gas volume of less than two cubic centimeters is preferably provided between the flow sensor in section 89 and the valve stem flow orifice 97. By so limiting such dead volume a high speed response is enabled by minimizing pressure stabilization times between the flow sensor and the valve flow orifice.

When the maximum flow required is in excess of the sensor's maximum flow rating, passive by-pass channels 88 are utilized. Their properties are chosen to match the sensor's pressure drop curve as a function of flow rate. The number of by-pass channels used determines the maximum flow rating of module 88. The diameter of valve orifice 97 is chosen to allow the full required flow rate but not made so large as to limit control resolution.

In plan view (not shown) the by-pass module envelope of the described preferred embodiment is a cylinder of 0.500 inches in internal diameter with the active flow sensor, bisecting the bypass conduit. The active flow measuring section, 59 has a thickness of 0.049 inches. The by-pass module has a length of 0.300 inches. The passive by-pass channels are formed with 0.300 inch long cylindrical tubing segments of stainless steel having a 0.014 inch ID and 0.004 wall thickness grouped together to form a tube bundle.

FIG. 10 shows a perspective view of a typical spring 85a utilized to radically locate the spring and press the armature valve seal 96 (FIG. 9) against the orifice 97.

FIGS. 11a and 11b show a typical mounting of a diode 99a or transistor 99b suspended on cross-arms of an integral dielectric membrane or web 26a to be formed across channel 23 as in FIGS. 2 and 3. Diodes or transistors may be employed in place of resistors 25, 31 and 34 deposited on the web and on the top surface areas of the substrate. FIG. 11b is a detail of the circled area in FIG. 11a.

FIG. 12 illustrates an alternative bridge and control circuit which regulates the voltage across $R_F$ to a constant or scheduled value by adding current ($\Delta I_F$) as the resistance drops with temperature due to flow cooling. In the FIG. 12 circuit, A6 is an operational amplifier and is referenced to $E_{REF}$. In circuit operation:

A1 holds $E_s=0$ by controlling $E_{BB}$
A2 holds $E_2=0$ by controlling $I_s$ and therefore $E_w$
A3 reproduces $E_w$ with no drain from $I_s$
A4 and A5 make $E_{S1}=E_{F1}$ so that $I_s R_{s1}=I_{F1}R_{F1}$
A6 provides the output signal $E_{out}=\Delta I_F R_6 + E_{REF}$ and supplies $\Delta I_F$ to hold $E_{F2}=E_{REF}$ The following equations describe this circuit:

$$E_w = I_w R_{w1} \quad (1)$$

$$E_w = I_s R_{s2} \quad (2)$$

$$-E_{BB} = I_w R_{wt} \quad (3)$$

$$-E_{BB} = I_s(R_s + R_{s1}) \quad (4)$$

$$R_{wt} = R_{w4} + \frac{RW}{1 + Rw/R_{w3}} \quad (5)$$

$$-E_{BB} + E_{REF} = I_{F2}(R_F + R_{FT}) \quad (6)$$

$$I_{F2} = I_{F1} + \Delta I_F \quad (7)$$

$$I_s R_{s1} = I_{F1} R_{F1} \quad (8)$$

$$E_{out} = \Delta I_F R_6 + E_{REF} \quad (9)$$

If it is assumed, for example, that all resistances and $E_{REF}$ are known, then the above eight equations define $E_w$, $E_{BB}$, $E_{out}$, $I_w$, $I_s$, $I_{F1}$, $I_{F2}$, and $\Delta I_F$ The above description of embodiments of this invention is intended to be illustrative and not limiting. Other embodiments of this invention will be obvious to those skilled in the art in view of the above disclosure.

We claim:

1. A mass flow meter comprising:
a semiconductor body having an elongate flow channel extending therethrough and a stagnant gas channel extending into said body;
a thin film first, self-heated, single element flow sensor suspended in said flow channel in said body;
a thin film stagnant, self-heated, single element flow sensor suspended in said stagnant gas channel in said body;
a body temperature sensor attached to said body adjacent to said flow sensors for providing an indication of the temperature of inlet gas flow in said flow channel to said first flow sensor and providing a body wall ambient reference temperature for said first flow sensor and said stagnant flow sensor; and
in which said semiconductor body comprises:
a first semiconductor substrate having an etched flow channel extending on a surface thereof, said first flow sensor being suspended across said etched flow channel and being integral with said substrate;
a first stagnant gas channel in said first substrate and extending parallel to said etched flow channel, said stagnant gas channel being connected to said inlet gas flow and including end wall means in said body for blocking flow of inlet gas through said stagnant gas channel; and
a second substrate having a gas flow channel and a stagnant gas channel spacedly extending on a surface thereof, said second substrate being mounted and sealed on said first substrate such that said gas flow channels and said stagnant gas channels are aligned to form a gas flow conduit and a stagnant gas conduit, respectively, in said body.

2. A mass flow meter comprising:
a semiconductor body having an elongate flow channel extending therethrough and a stagnant gas channel extending into said body;
a thin film first, self-heated, single element flow sensor suspended in said flow channel in said body;

a thin film stagnant, self-heated, single element flow sensor suspended in said stagnant gas channel in said body;

a body temperature sensor attached to said body adjacent to said flow sensors for providing an indication of the temperature of inlet gas flow in said flow channel to said first flow sensor and providing a body wall ambient reference temperature for said first flow sensor and said stagnant fow sensor;

means for supplying electrical power to said first flow sensor and said stagnant flow sensor for self-heating said first flow sensor and said stagnant flow sensor;

means for regulating said power supplied to said stagnant flow sensor resulting ina constant temperature rise above the temperature of the body temperature sensor;

means for comparing resistance values from said first flow sensor and stagnant flow sensor indicative of the temperature differences betwen said first flow sensor and stagnant flow sensor;

means for processing electrical signals from said first flow sensor and stagnat flow sensor indicative of the temperature of said flow sensor and stagnant flow sensor;

means for supplying heating current to said first flow sensor and said stagnant flow sensor to maintain the first flow sensor voltage equal to the stagnant flow sensor voltage; and means for measuring the current needed to equalize said voltages for indicating mass flow rate.

3. A mass flow meter comprising:

a semiconductor body having an elongate flow channel extending therethrough and a stagnant gas channel extending into said body;

a thin film first, self-heated, single element flow sensor suspended in said flow channel in said body;

a thin film stagnant, self-heated, single element flow sensor suspended in said stagnant gas channel in said body;

a body temperature sensor attached to said body adjacent to said flow sensors for providing an indication of the temperature of inlet gas flow in said flow channel to said first flow sensor and providing a body wall ambient reference temperature for said first flow sensor and said stagnant flow sensor;

means, including a bridge circuit, wherein said sensors are active bridge elements for processing electrical signals from said sensors indicative of the temperature of said sensors and the thermal conductivity of a fluid surrounding said flow and stagnant sensors;

means for deriving a gas mass flow rate signal from said bridge circuit;

means connected in flow communication with said flow channel and responsive to said gas mass flow rate signal for controlling gas flow from said gas flow channel; and wherein said means for controlling gas flow comprises a control valve downstream or upstream of said gas flow channel; said control valve including a housing, a flow orifice in said housing, an armature containing a valve seal in said housing and an electromagnetic coil for moving said armature and actuatable by said flow rate signal for moving said valve seal to said orifice to control the flow of gas through said orifice and said flow channel.

* * * * *

UNITED STATES PATENT AND TRADEMARK OFFICE
CERTIFICATE OF CORRECTION

PATENT NO. : 4,685,331
DATED : August 11, 1987
INVENTOR(S) : Wayne G. Renken et al.

It is certified that error appears in the above-identified patent and that said Letters Patent is hereby corrected as shown below:

Col. 5, line 8, delete "temp" and substitute --temp.--.
Col. 5, line 20 delete "$T_s - T_A$" and substitute --$T_s = T_A$--.
Col. 8, line 32, after "$R_F$," delete "and".
Col. 9, line 59, insert a period after "channels".
Col. 13, line 17, delete "ina" and substitute -- in a --.

Signed and Sealed this

Nineteenth Day of July, 1988

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,685,331

DATED : August 11, 1987

INVENTOR(S) : Wayne G. Renken et al.

It is certified that error appears in the above-identified patent and that said Letters Patent is hereby corrected as shown below:

Column 5, line 8, delete "temp" and substitute -- temp.--.

Col. 5, line 20, delete "-" before constant and substitute therefore --=--.

Col. 8, line 32, after "$R_F$," delete "and".

Col. 9, line 59, insert a period after "channels".

Col. 13, line 17, delete "ina" and substitute --in a--.

This certificate supersedes Certificate of Correction issued July 19, 1988.

Signed and Sealed this

Twenty-third Day of August, 1988

Attest:

DONALD J. QUIGG

*Attesting Officer*  *Commissioner of Patents and Trademarks*